Figure 5:
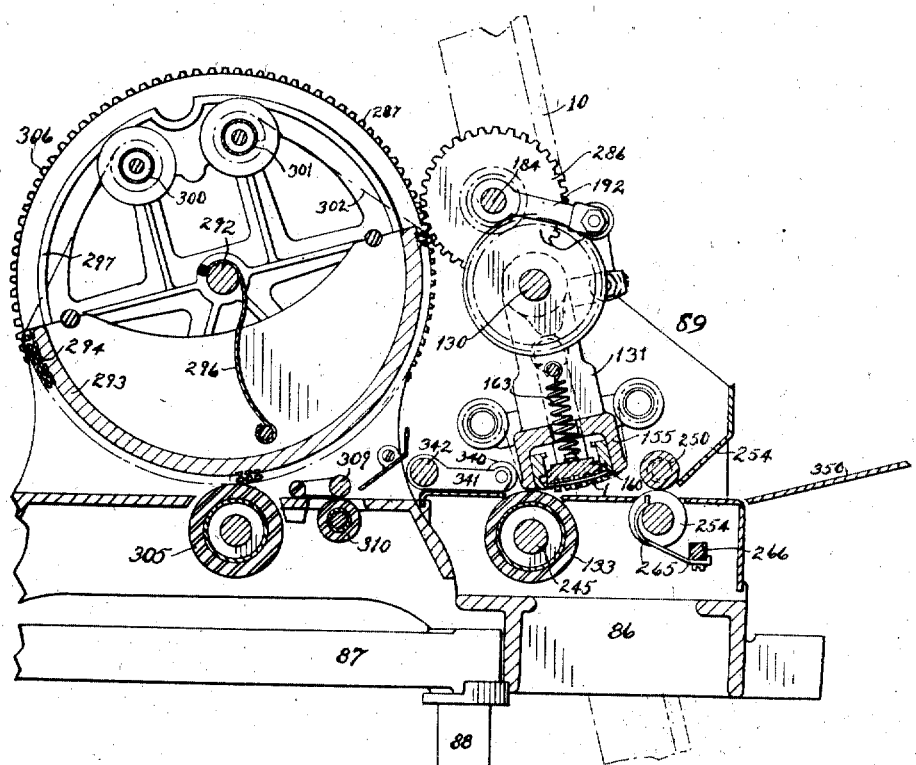

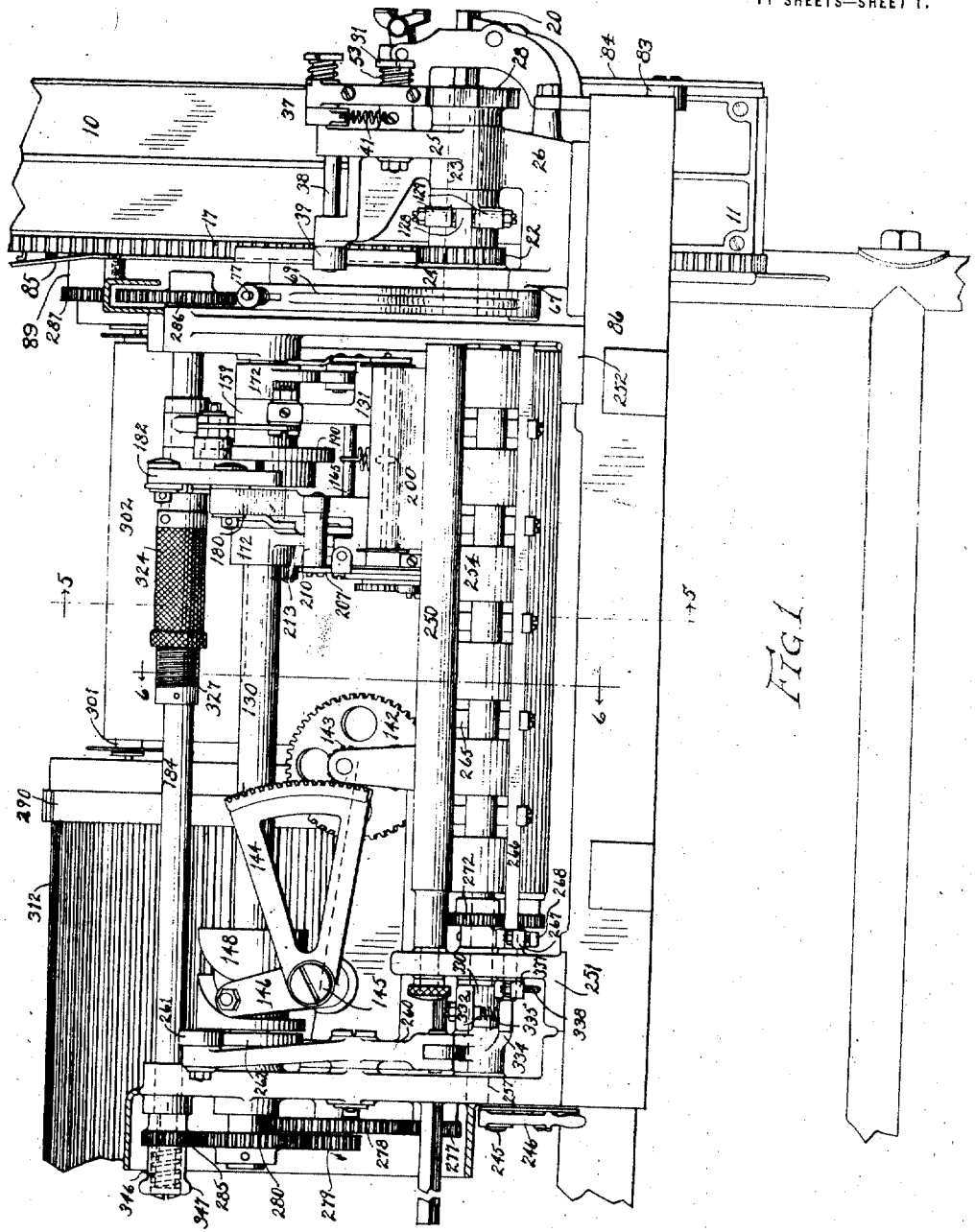

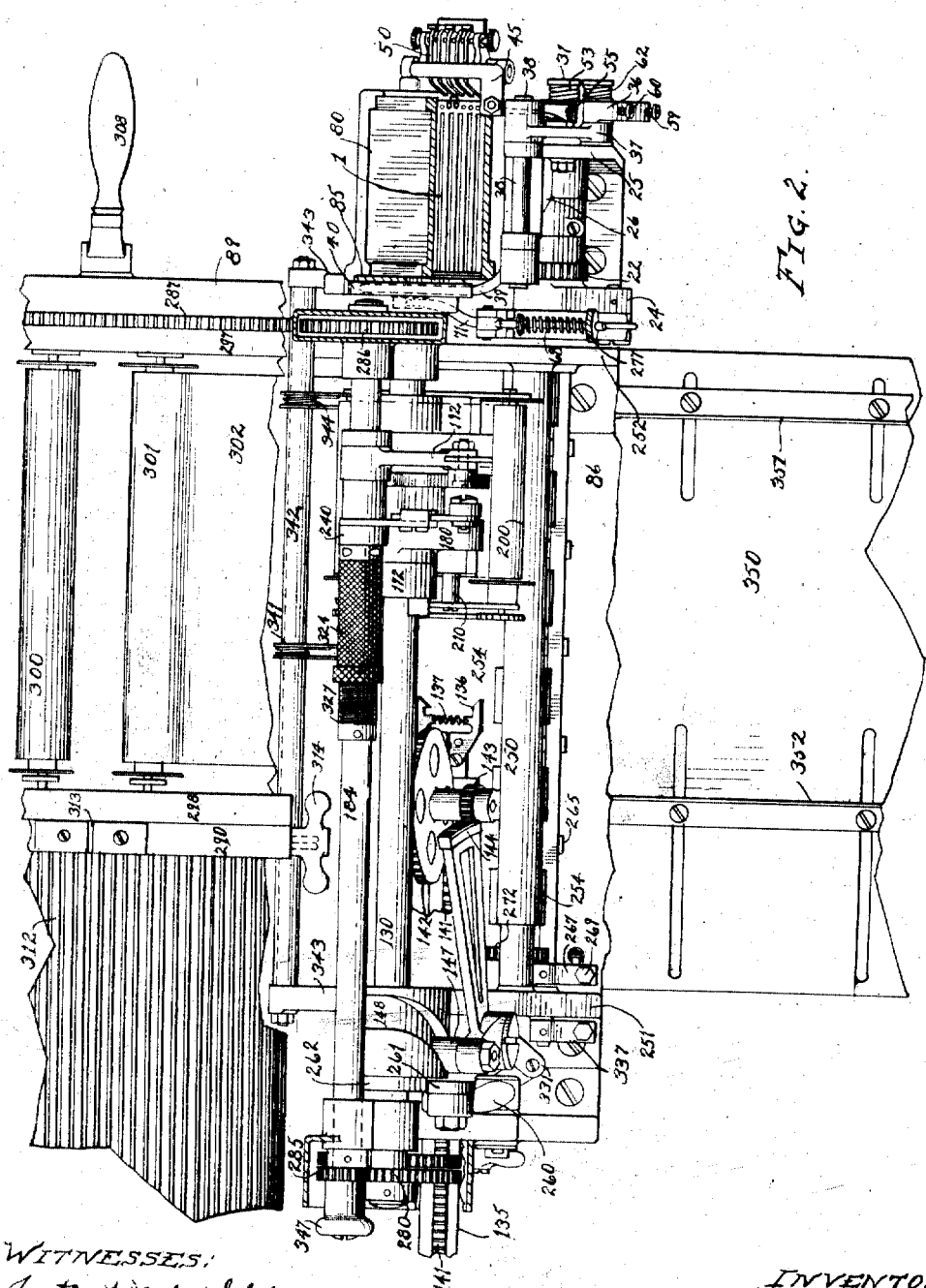

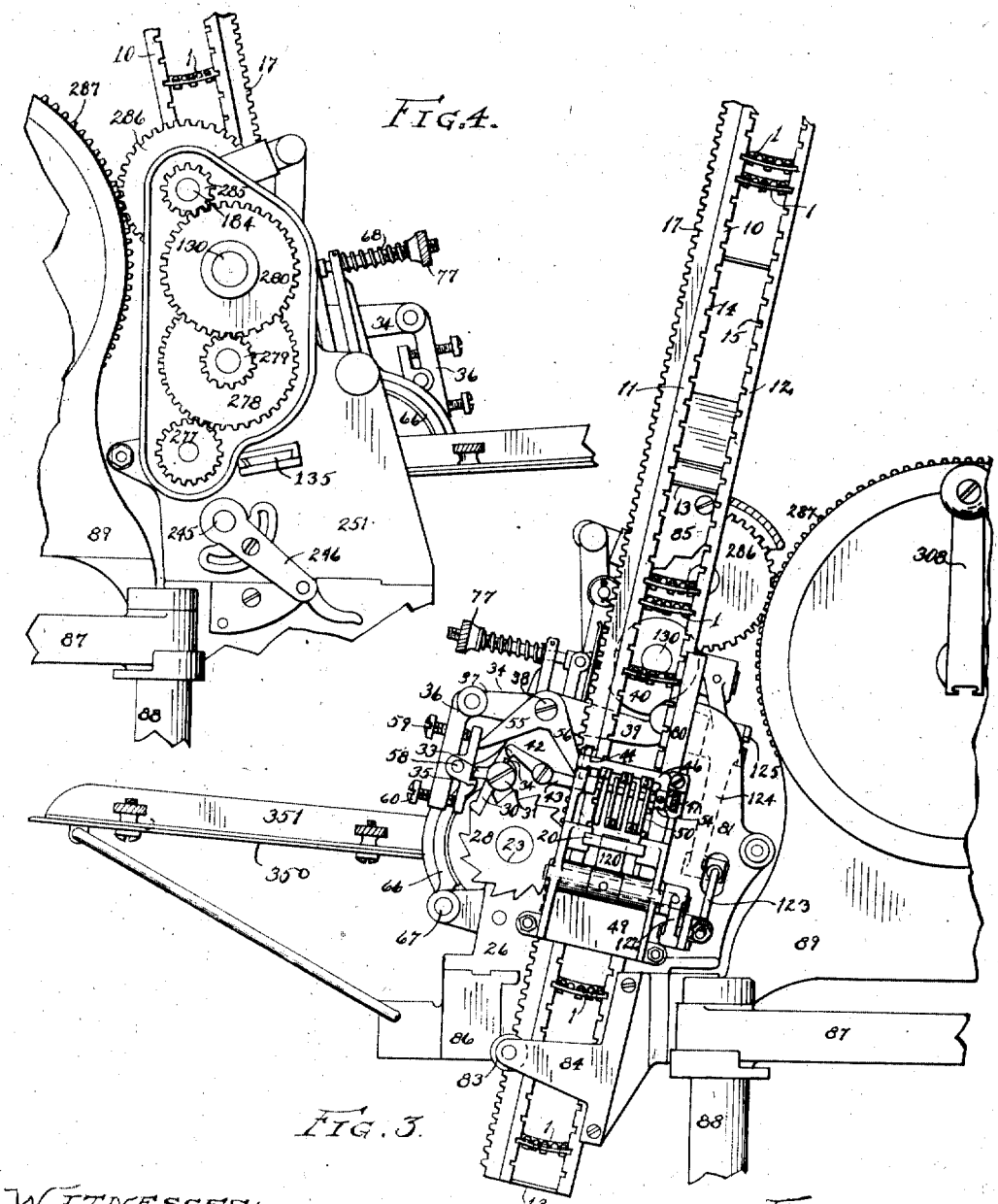

G. T. TRUNDLE.
ADDRESSING MECHANISM.
APPLICATION FILED MAY 31, 1913.

1,252,970.

Patented Jan. 8, 1918.
11 SHEETS—SHEET 4.

WITNESSES
Justus W Macklin
Roe S Johnston

INVENTOR
George T. Trundle,
BY Albert H. Bates,
ATT'Y

G. T. TRUNDLE.
ADDRESSING MECHANISM.
APPLICATION FILED MAY 31, 1913.

1,252,970.

Patented Jan. 8, 1918.
11 SHEETS—SHEET 5.

G. T. TRUNDLE.
ADDRESSING MECHANISM.
APPLICATION FILED MAY 31, 1913.

1,252,970.

Patented Jan. 8, 1918.
11 SHEETS—SHEET 7.

WITNESSES:
Justin W Mackl...
Roe S Johnston

INVENTOR
George T. Trundle,
BY Albert H. Baker,
ATT'Y

G. T. TRUNDLE.
ADDRESSING MECHANISM.
APPLICATION FILED MAY 31, 1913.

1,252,970.

Patented Jan. 8, 1918.
11 SHEETS—SHEET 8.

WITNESSES:
Justin W. Macklin
Roe S. Johnston

INVENTOR:
George T. Trundle,
BY Albert H. Baker
ATT'Y

G. T. TRUNDLE.
ADDRESSING MECHANISM.
APPLICATION FILED MAY 31, 1913.

1,252,970.

Patented Jan. 8, 1918
11 SHEETS—SHEET 9.

G. T. TRUNDLE.
ADDRESSING MECHANISM.
APPLICATION FILED MAY 31, 1913.

1,252,970.

Patented Jan. 8, 1918.
11 SHEETS—SHEET 10.

WITNESSES:
Justin W. Macklin
Roe S. Johnston

INVENTOR:
George T. Trundle
BY Albert N. Baker
ATTY

G. T. TRUNDLE.
ADDRESSING MECHANISM.
APPLICATION FILED MAY 31, 1913.

1,252,970.

Patented Jan. 8, 1918.
11 SHEETS—SHEET 11.

WITNESSES:
Justin W Macklin
Roe S Johnston

INVENTOR:
George T. Trundle,
BY Albert H. Bates,
ATTY

UNITED STATES PATENT OFFICE.

GEORGE T. TRUNDLE, OF CLEVELAND, OHIO, ASSIGNOR TO THE AMERICAN MULTIGRAPH COMPANY, OF CLEVELAND, OHIO, A CORPORATION OF OHIO.

ADDRESSING MECHANISM.

1,252,970.  Specification of Letters Patent.  Patented Jan. 8, 1918.

Application filed May 31, 1913. Serial No. 770,842.

*To all whom it may concern:*

Be it known that I, GEORGE T. TRUNDLE, a citizen of the United States, residing at Cleveland, in the county of Cuyahoga and State of Ohio, have invented a certain new and useful Improvement in Addressing Mechanism, of which the following is a full, clear, and exact description, reference being had to the accompanying drawings.

The object of this invention is to provide an effective addressing machine for use either alone or in conjunction with a printing mechanism, whereby envelops, post cards, addressed letters and similar matter may be produced rapidly and efficiently. My addressing mechanism comprises a set of individual address plates, mechanism for selecting the desired plate, moving it into printing position, printing from it, and returning it to its storage receptacle. Various features of the machine are comprised within this invention, among which may be mentioned the means for selecting the desired address plates, means for feeding them to and from the printing device, means for printing from such address plates, mechanism by which the address printer is correlated with the printing machine so that the address may be printed on one portion of the sheet while the body is being printed on another portion thereof. Various other features contributing to the efficiency of the complete machine are also comprised within my invention. The invention may, therefore, be most conveniently summarized as consisting of the combinations of coöperating elements herein illustrated and set out in the claims.

Figure 14:
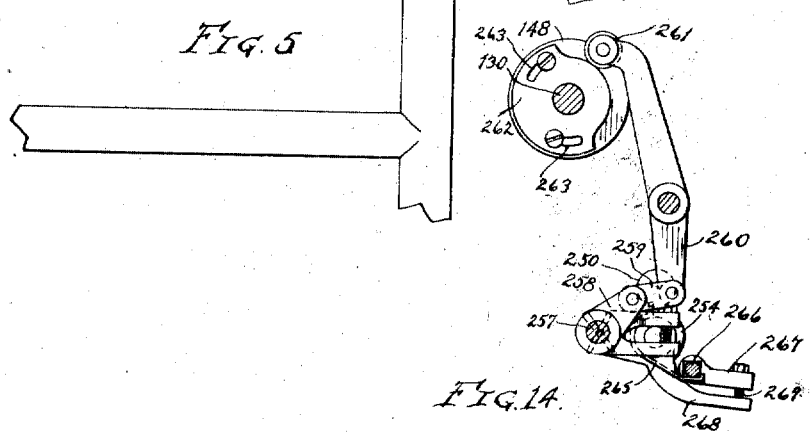
Figure 6:
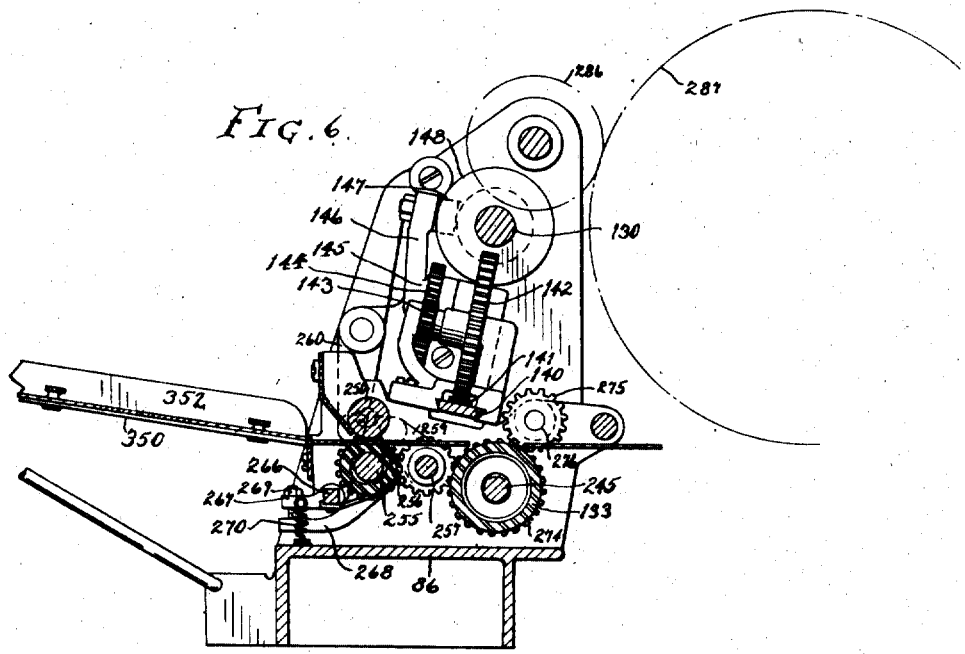
Figure 7:
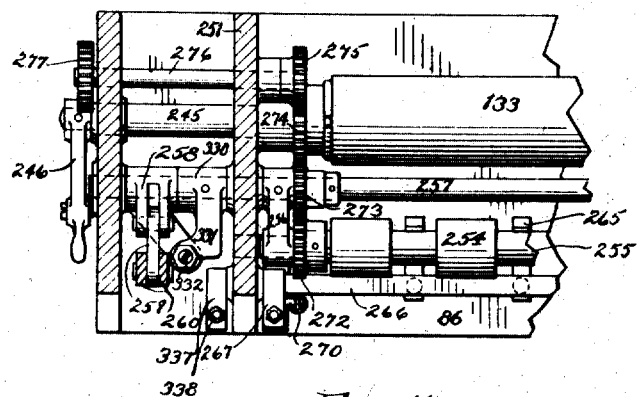
Figures 7, 8:
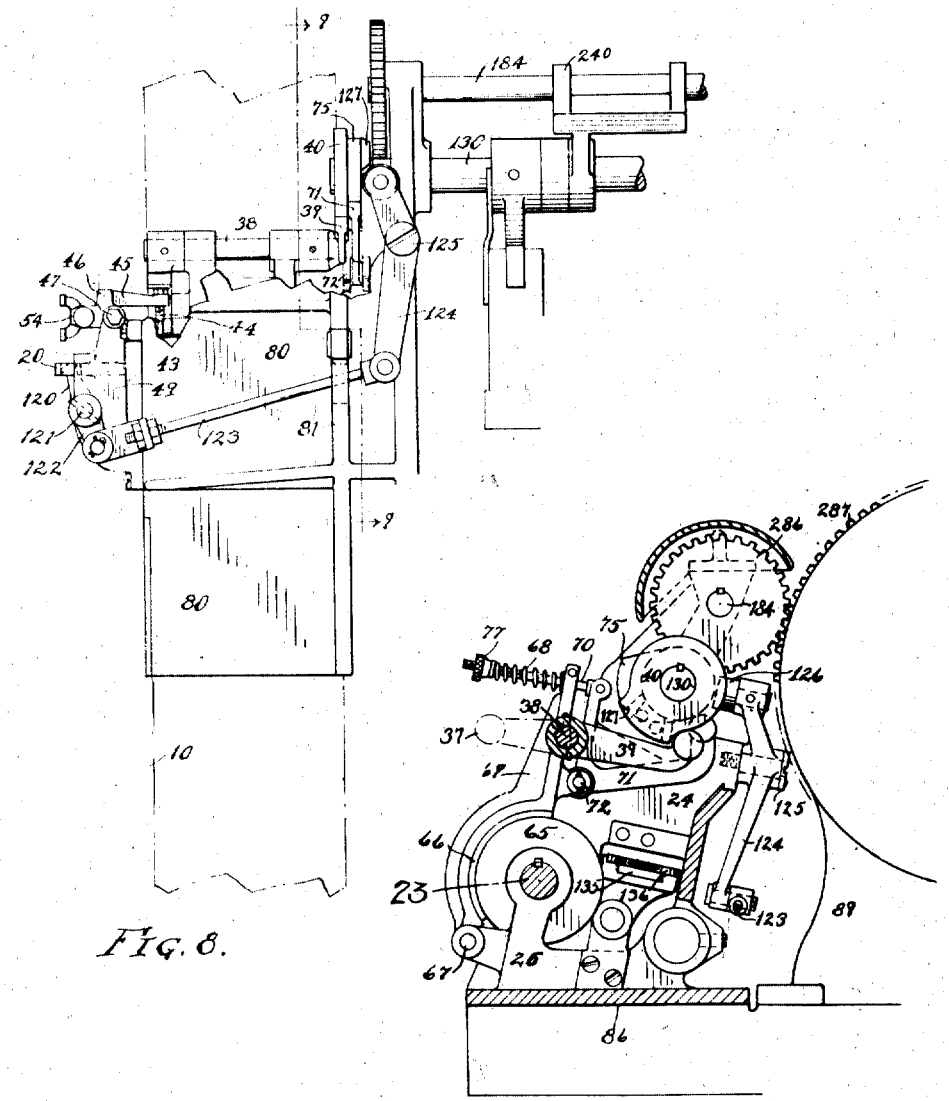
Figure 10:
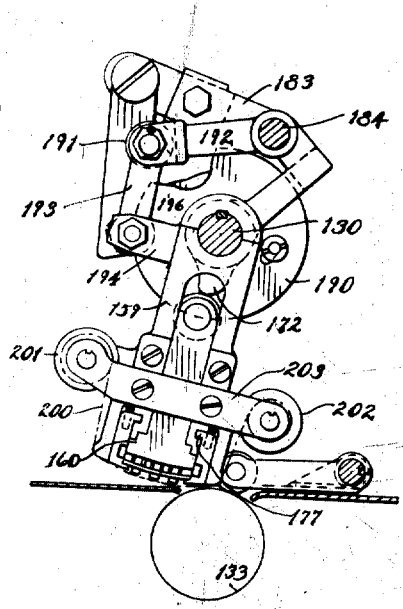
Figure 11:
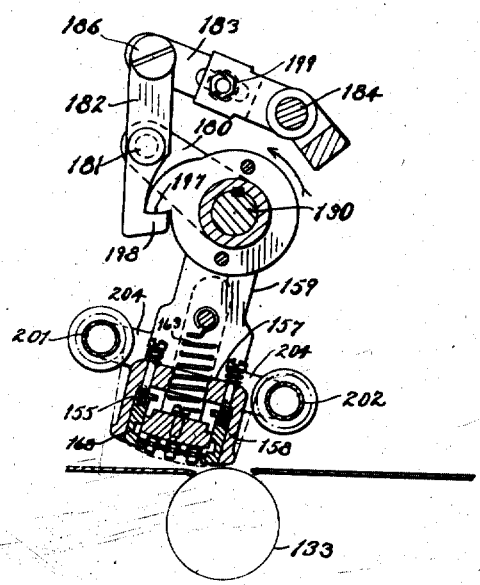
Figure 12:
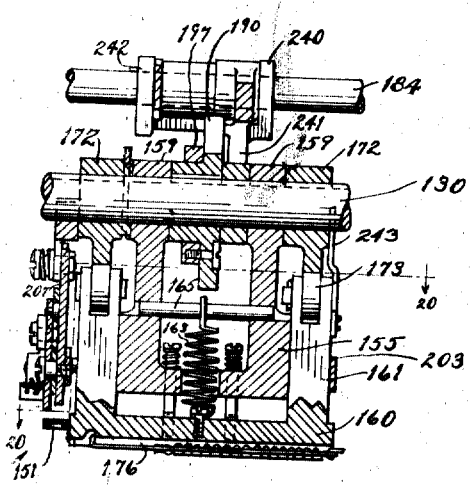
Figure 13:
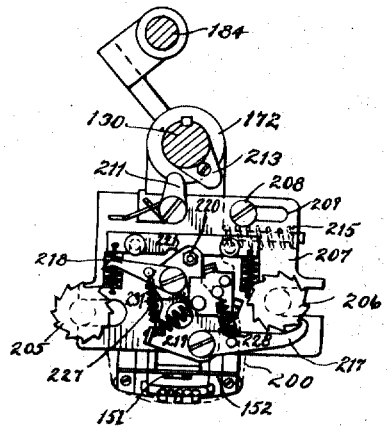
Figure 17:
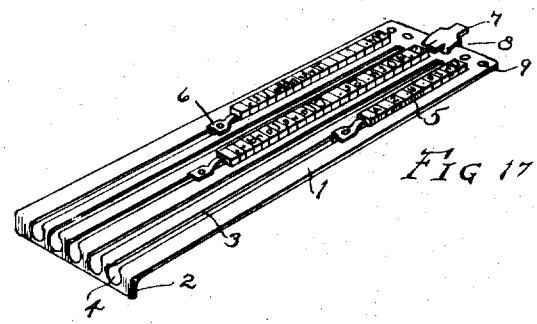
Figure 18:
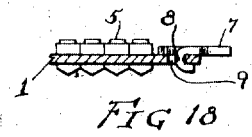
Figure 15:
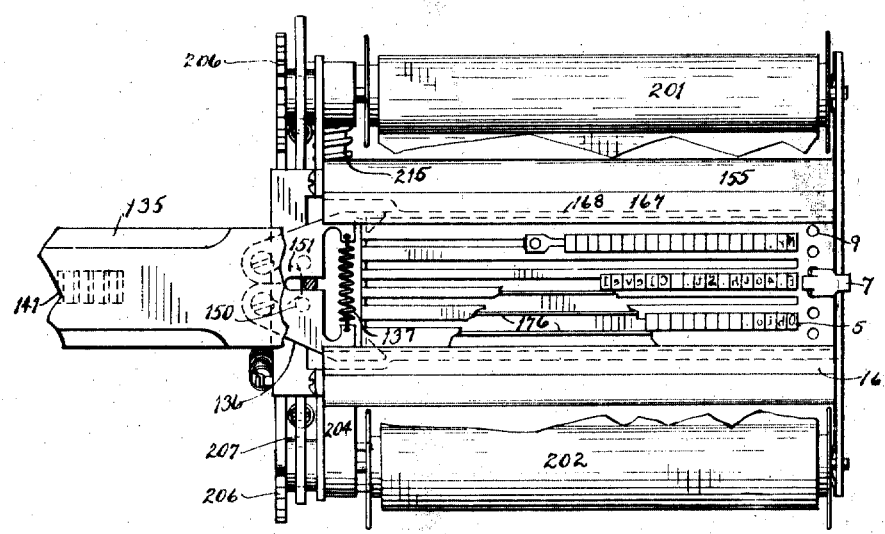
Figure 16:
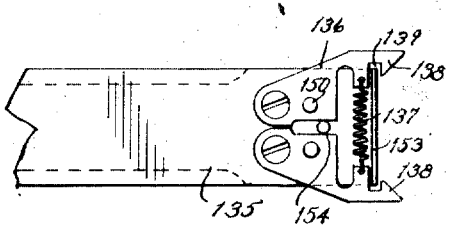
Figure 19:
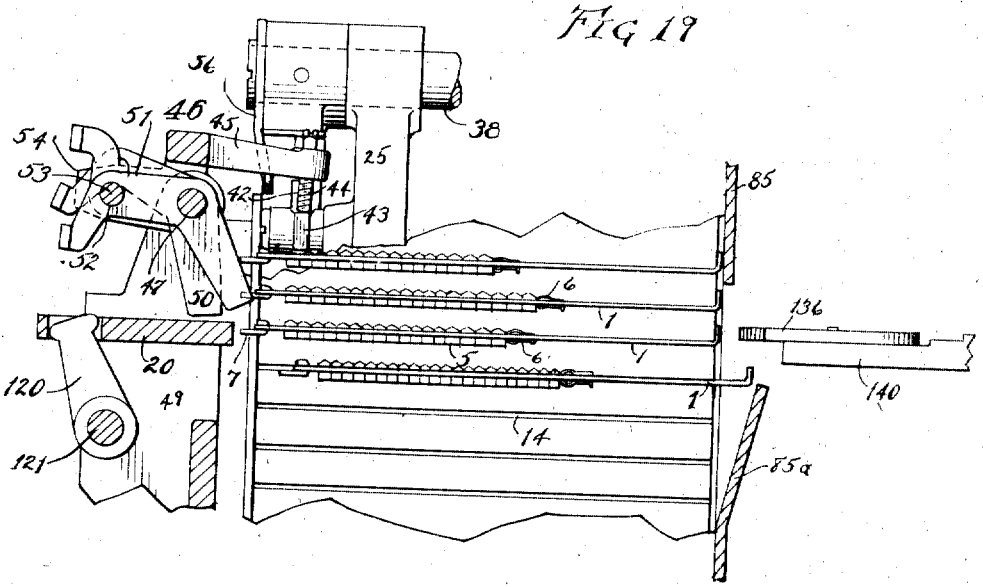
Figure 20:
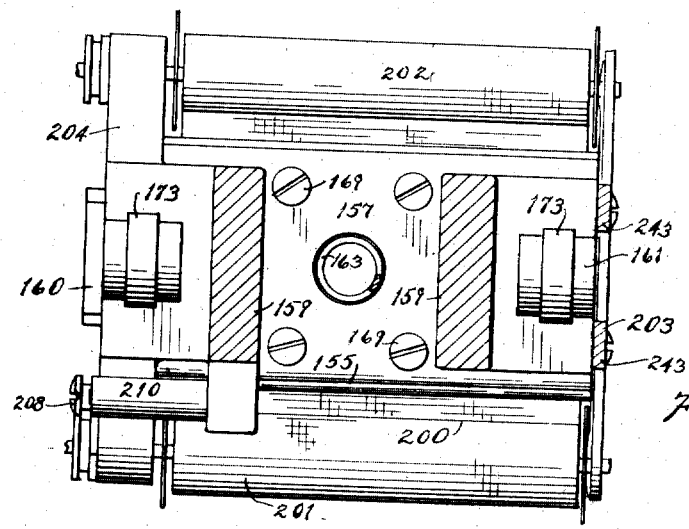
Figure 21:
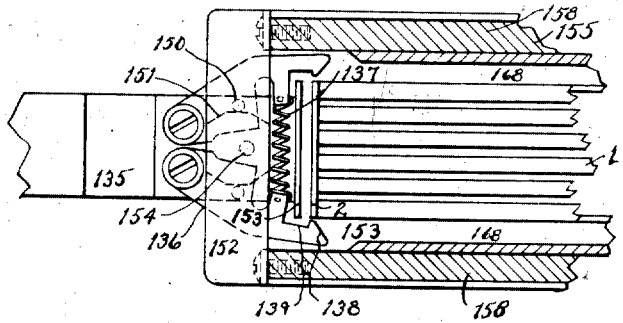
Figure 22:
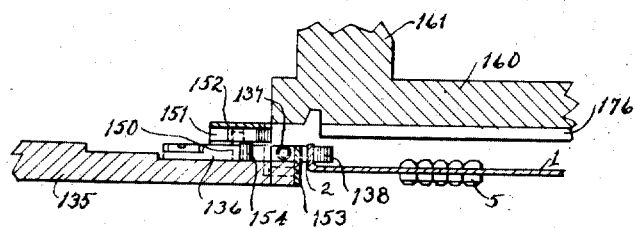
Figure 23:
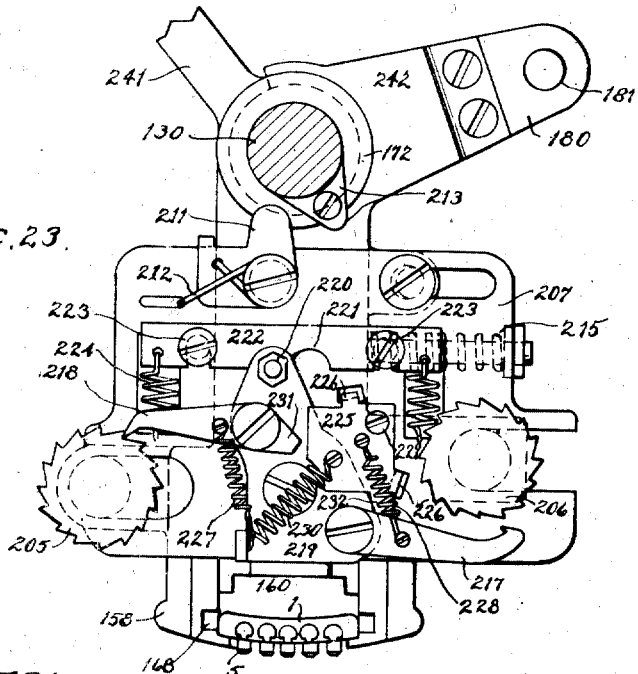
Figure 24:
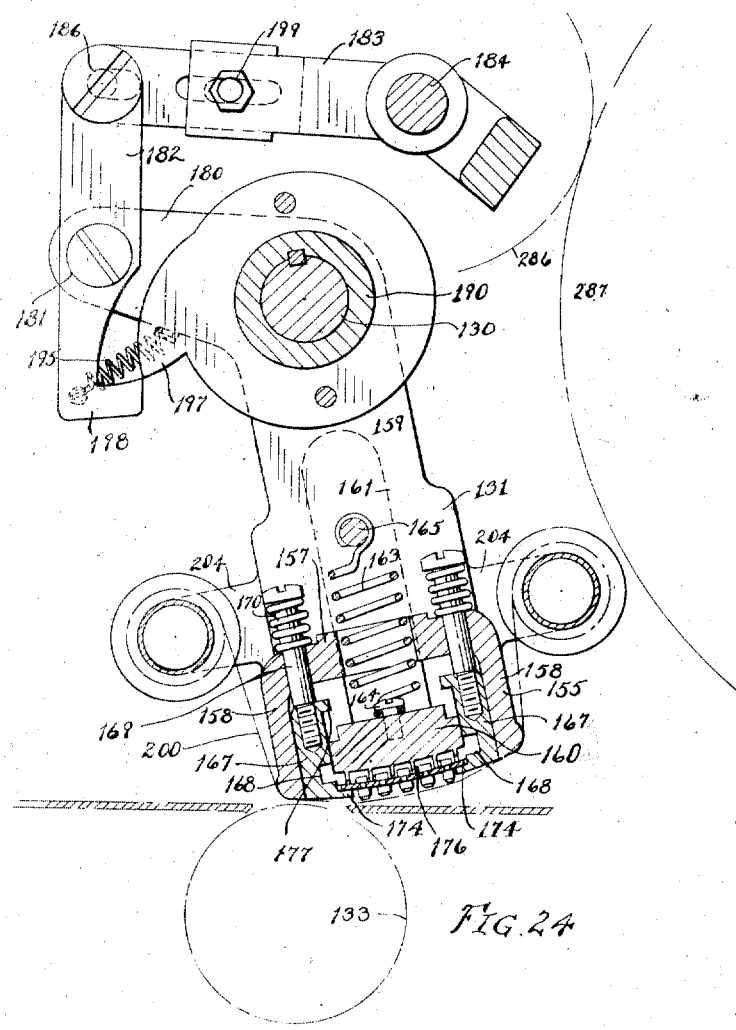
Figure 26:
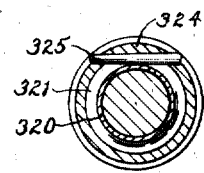
Figure 25:
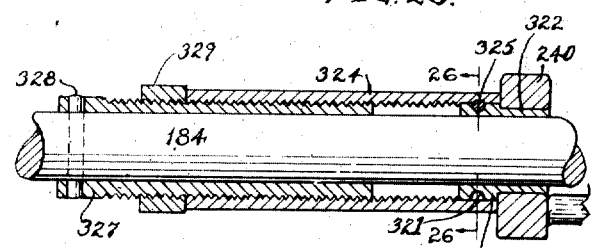

The drawings show my addressing machine embodied with a rotary printing machine of the type known as the multigraph. Figure 1 is a front elevation of the addressing machine, showing a portion of the multigraph at the rear thereof; Fig. 2 is a plan of the combined machine shown in Fig. 1; Fig. 3 is a right hand end view of the addressing machine and multigraph; Fig. 4 is a left hand end view; Fig. 5 is a vertical cross section through the intermediate portion of the machine, as indicated by the line 5—5 of Fig. 1, looking toward the right; Fig. 6 is a vertical cross section on the line 6—6 of Fig. 1 looking toward the left; Fig. 7 is a plan of the operating mechanism for the paper feed of the addressing machine and portions of the feed rollers, being those shown in cross section in Fig. 6; Fig. 8 is a rear elevation of the right hand portion of the machine showing the mechanism for shoving the plates from their receptacle; Fig. 9 is a vertical cross section of such mechanism, as indicated by the line 9—9 on Fig. 8, looking toward the right hand of said figure; Fig. 10 is an end elevation of the swinging carrier for the address plate, which moves this plate in coöperation with a rotary platen; Fig. 11 is a vertical central section through the address plate carrier in a plane parallel with Fig. 10; Fig. 12 is a central cross section of the carrier in a plane at right angles to Fig. 11; Fig. 13 is a left hand end view of the carrier, showing the ribbon feeding mechanism; Fig. 14 is a detail showing an elevation of the mechanism for operating the paper feed of the addressing machine; Fig. 15 is an enlarged bottom plan of the carrier for the address plate shown in Figs. 10 to 13 inclusive. This figure and the remaining figures are on an enlarged scale. Fig. 16 is a detail in plan of the gripper for shifting the address plate; Fig. 17 is a perspective view of an address plate which may be conveniently used in my machine; Fig. 18 is a detail showing the selecting tongue on one end of the address plate; Fig. 19 is a substantially vertical section looking forward from the rear of the machine and showing the selecting mechanism; Fig. 20 is a horizontal section through the address plate carrier taken substantially on the line 20—20 of Fig. 12; Fig. 21 is a horizontal section taken through the lower portion of the address plate carrier and showing the gripper for shifting the address plate in its releasing position; Fig. 22 is a section taken on a plane at right angles to the plane of Fig. 21, showing the same parts; Fig. 23 is an elevation of the ribbon feeding mechanism, the same being substantially an enlargement of Fig. 13 with the pawls in another position; Fig. 24 is a vertical central section through the address plate carrier in the same plane as Fig. 11, and showing the carrier and its operating mechanism in releasing position; Fig. 25 is a longitudinal section of the mechanism for laterally adjusting the address plate carrier; Fig. 26 is a cross section taken on the line 26—26 of Fig. 25.

My machine operates with separate disconnected address plates which are fed from a suitable receptacle to the carrier, printed from and returned to the receptacle. Such address plate may be made of various forms. One convenient form is that illustrated in Fig. 17, and claimed in Patent No. 1,048,868 to H. C. Gammeter. As here shown, the address plate consists of a thin sheet metal plate 1 having one end turned or flanged at 2 and having in its body parallel slots 3 communicating with enlargements 4 in the offset or flanged end. Suitable type 5 are mounted in these slots. Such type may conveniently be grooved on their opposite sides and slide into place through the openings 4. When in place they are blocked by suitable clips, as, for example, the clips 6 which extend through the slots and bridge them above and below and clamp on the plate, such clips being claimed in my Patent No. 1,083,711. The address plate is further provided with a tongue 7 which projects from the end opposite the flanged end 2. This tongue is differently positioned on different plates to enable a convenient selection of addresses of various character. To that end I prefer to make the tongue a separate piece of metal held on the plate by means of two fingers 8, formed by slits parallel with the edges of the tongue—these fingers extending through openings 9 in the plate and being bent over onto the other side of the plate to clamp the tongue thereto. There are preferably several of these holes 9 at this end of the plate which enables the tongue to be located in various positions so that selecting mechanism on the machine, set to coöperate with tongues in a certain position, will select all of a certain class of addresses.

A large number of address plates, which may be of the character just described, are contained in a suitable receptacle which is designed to be removably mounted in the addressing machine. Such receptacle is indicated at 10 in Figs. 1, 3, 4, 5 and 8. As there shown, it consists of an open-sided box-like frame having a front wall 11, a rear wall 12 and various cross braces 13. The inner face of each wall is grooved, as shown at 14 and 15, to provide ways into which the address plate may be slid. The plates are mounted in the receptacle with their flanged ends 2 at the left side of the receptacle, the edge portions of such flanged ends overhanging the sides of the walls 11 and 12 adjacent to the grooves. Accordingly, when the receptacles are removed, they may stand on the edge appearing in Fig. 3, as a bottom; the plates being supported by the flanges 2 on what is then the top of the receptacle. In this form the receptacles may be inserted as drawers in a suitable cabinet or other container.

The receptacle, with its address plates, is placed in the machine in an approximately upright position, as illustrated in Fig. 3, and travels downwardly through the machine as the address plates are used, and, at the end of its operation, is discharged at the bottom of the machine. The travel of the receptacle is controlled by a rack 17 mounted on the front side of the receptacle adjacent to the left hand edge. This rack may be a permanent part of the receptacle, in which case one is provided for each receptacle, or it may be a separate device and the receptacle secured to it as it is about to be placed in the machine, in which case two racks will be used as it is desirable to place the receptacles in the machine one upon the other, so that it is not necessary to stop the machine for each receptacle.

At the right hand side of the receptacle slidably mounted in the frame of the machine is a plunger 20 (Figs. 1, 2, 3 and 19), and the descent of the receptacle is controlled to present the desired address plates one after the other in front of the plunger 20, which moves toward the left to shove such address plate partly out of the receptacle and into the grasp of the transferring mechanism, to be described. To control the downward feed of the receptacle so that it presents the desired address plates successively in front of the plunger 20, I provide the following mechanism. The rack 17 meshes with a gear 22 which is mounted on a shaft 23 journaled in the standards 24 and 25 of a frame bracket 26. The gear 22 is rigid with the shaft in operation, but is adjustable thereon, as hereinafter explained. On the right hand end of the shaft is a ratchet wheel 28 with which coacts a pawl 30 carried by a pivot pin 31 screwing into the upright 25. On this pawl is a forwardly extending arm 33 and an upwardly extending shoulder 34. Coacting with the arm 33 is a dog 35 mounted on an arm 36, which depends from a rock arm 37 on a rock shaft 38. Extending from this rock shaft is another arm 39 which is caused to bear against a cam 40 by means of a spring 41 on the arm 37 (Fig. 1). When this cam depresses the arm 39 it thereby raises the dog 35, which, pulling up on the arm 33, swings the pawl 30 out of engagement with the ratchet wheel, thus releasing the address plate receptacle and allowing it to descend by gravity.

To control this descent I provide an intermediately pivoted catch lever 42, which has a nose adapted to engage with the shoulder 34 and extends rearwardly of its pivot at 43 beneath a set screw 44 (Figs. 3, 8 and 19) which is on an arm 45 extending from the rocking frame 46 pivoted on a shaft 47. This shaft is mounted in a bracket 49, which is secured to the frame bracket 26 above referred to. The rocking frame carries selectors 50, to be hereinafter more fully described. For the present, it may be stated that these selectors correspond to the different possible positions of the tongue 7 on the end of the address plate, and when it is desired to select address plates having tongues of a certain position, the corresponding selector is set so that when any of such address plates come opposite the selector its frame is thereby rocked, the other address plates passing the frame idly. This rocking of the selector frame brings the set screw 44 down onto the rearward extension 43 of the catch 42 and releases the shoulder 34, so that the pawl 30 swings back into engagement with the ratchet wheel. A suitable spring 53 surroundings the screw stud 31 presses the pawl into this locking position.

From the above description it will be seen that, on every rotation of the cam 40, the dog 35 pulls the blocking pawl 30 out of engagement with the ratchet wheel and thereupon the catch 42 engages the shoulder 34 and holds the pawl in such idle position while the address plate receptacle descends by gravity, rotating the gear 22 and ratchet wheel 28. As soon as the desired address plate, however, comes opposite the selector, the rocking of the selector frame forces the catch 42 away from the shoulder 34 and the pawl 30 returns to position to engage the next ratchet tooth and stop the downward feed.

To prevent an unduly great downward movement of the receptacle in case the machine should happen to be stopped while the cam 40 is in the position where the pawl 30 is just out of engagement with the ratchet 28 and before the dog 35 releases the arm 33, I provide a bell-crank lever 55 pivotally hung on the shaft 38, and adapted to press outwardly on the dog 35, thereby swinging the arm 36 and releasing the pawl 30, so that it is free to engage the ratchet 28. The rear arm 56 of this bell-crank extends rearwardly and downwardly from the shaft 38, hooking under the arm 45 of the rocking frame 46. By means of this bell-crank lever, when the receptacle drops, the next desired address plate will engage one of the selectors 50, rocking the frame 46 and the arm 45, pressing the arm 56 downwardly, disengaging the dog 35 from the arm 33, and thereby permitting the pawl 30 to engage the ratchet, stopping the receptacle with the desired address plate opposite the pusher 20.

It is to be understood that a suitable guideway is provided for the receptacle, in the upper end of which it may be placed, and down which it may travel, as desired, to present the address plates opposite the plunger 20. This guideway, as shown herein, comprises the upwardly extending inclined plate 80, conveniently made integral with a frame bracket 81 and having forwardly extending side flanges slightly overhanging the rear wall of the receptacle. The gear 22 meshing with the rack 17 insures that side of the receptacle being against the guide plate 80. To hold the opposite edge to its seat, I provide the roller 83 carried by the frame bracket 84 in position to engage the right hand portion of the front of the receptacle. 85 indicates a shield plate which stands opposite the left hand side of the receptacle and close to it, while inclining away from it at the upper end of the shield. Accordingly, this plate cams back into the receptacle any address plates which may have been jarred outwardly from their seats.

The frame brackets 26, 81 and 84 referred to are conveniently mounted on a suitable bed plate, as the plate 86. This bed plate is shown as a long horizontal casting which carries the brackets mentioned and others, to be hereinafter referred to, adjacent to the left hand end of the machine. When the addressing machine is used in conjunction with the multigraph or other printing machine, the bed plate 86 is preferably secured to the front of the standard or frame carrying the printing machine. As shown in Figs. 3 and 4, the bed plate is secured on the forward edge of the plate 87, which is mounted between a suitable stand 88 and the frame 89 of the multigraph or printing machine.

The selectors for stopping the desired address plate opposite the pusher 20, comprise the depending fingers 50 pivotally mounted on the shaft 47, between the ends of the U-shaped portion of the rocking frame 46. Extending outwardly from these fingers adjacent to their pivots are arms 51, each having a hole 52 near its outer end, through which the pin 53 is adapted to slide. This pin 53 is held at each end by lugs 54 extending outwardly from the rocking frame 46. The outer portions of these arms 51 alternately extend upwardly and downwardly from the holes 52 so that they may be conveniently grasped by hand, and the end of these extensions may be turned back at right angles to present a suitable surface for index numerals, as shown in Fig. 3. When the fingers 50 are in operative position, the pin 53 passes through the holes 52 in the arms 51. When it is desired to make any selector inoperative, the pin 53 is temporarily drawn out, and the arm 51 of that selector raised and allowed to rest on the top of the pin 53 when returned, thus holding the finger 50 out of the path of the tongues 7 on the address plates. It will be seen by this arrangement that any or all of these fingers may be operative, thus selecting the class of addresses desired.

It is desirable to provide a suitable brake retarding the downward movement of the receptacle, and this may be conveniently accomplished by extending the shaft 23 beyond the bearing 24 and mounting on it a smooth peripheried wheel 65 (Fig. 9) against which bears a brake shoe 66. The brake shoe is shown as pivoted at 67 to an ear on the frame bracket 26. Its binding effect is caused by a spring 68 which bears against an arm 69 extending upwardly from the brake shoe. The spring is shown as a helical compression spring surrounding a rod 70, which is pivoted at its inner end to the bell-crank lever 71. This bell-crank is carried on the arm 69, and has its rear end extending into coaction with a cam 75 on the same shaft with the cam 40. This cam 75 operates to apply the brake just after the movement of the pawl 30 has released the receptacle and the receptacle has started to move. Accordingly, the brake does not interfere with the force of gravity overcoming the inertia of rest of the receptacle and its geared parts, but, after the movement has begun, the application of the brake retards it to prevent jar when it is again brought to rest. The force of the spring 68 is adjusted by a thumb nut 77 screwing onto the rod 70.

When the address plate desired for use arrives in front of the plunger 20, the latter is operated to shove it a short distance toward the left, where it is grasped by a suitable gripper and pulled into the printing device. The mechanism for operating this plunger 20 is best shown in Figs. 3, 8 and 19. It consists of an arm 120 having its upper end engaged with an opening on the plunger and having its lower end secured on a rock shaft 121, which is journaled in the bracket 49. On the end of this shaft is a depending arm 122 connected by an adjustable link 123 with the lower end of the lever 124. This lever is pivoted at 125 and carries at its upper end a roller 126 coacting with the crown cam 127 formed on the side of the cam 75, heretofore referred to. The cams 75 and 40 are mounted on a transverse shaft 130, which may be termed the main shaft of the addressing machine. Accordingly, when this shaft is rotated, it operates to release the address plate receptacle, which is stopped when a plate having the desired character is opposite the plunger, to apply a brake to the downward movement thereof, and to operate the plunger to force the selected plate into the grasp of the gripper.

It is desirable to adjust the relative position of the teeth of the ratchet 28 with the teeth of the gear 22, so that the address plates will be stopped in the proper position in front of the pusher 20. Accordingly, I provide tongues 128 on the hub of the gear 22, which is loose on the shaft 23. These tongues stand in suitable recesses in a collar adjacent the hub and rigid on the shaft, and the gear 22 may be moved slightly about the shaft by screws carried by bosses 129 on the collar Fig. 1.

Loosely mounted on the main shaft 130 and adapted to be swung is a carrier 131, which receives and supports the address plate when it is in printing position. This carrier coacts with a suitable platen 133 to effect the printing. The address plate, when shoved to the left by the plunger 20, is grasped and drawn into the carrier by a reciprocating gripper, best shown in Figs. 2, 15, 16, 21 and 22. This gripper consists of a slidable bar 135, to the right hand end of which are pivoted two jaws 136 drawn toward each other by a spring 137. The jaws have flaring noses 138, behind which are recesses 139.

The bar 135 is slidable on a dove-tailed groove 140, (Fig. 6) in the frame and has on its upper edge rack teeth 141. Coacting with these rack teeth is a rotatably mounted gear wheel 142. On the shaft of this gear wheel is a pinion 143 which meshes with rack teeth on a segment 144. This segment is pivoted at 145 and has an upwardly extending arm 146 provided with a roller 147 engaging in the groove of a double crown cam 148 on the shaft 130. The rotation of this shaft accordingly operates to shove the bar 135 to the right where the jaws come into position to grasp the flange 2 of the address plate shoved out by the plunger 20, as already described. Then the cam causes the gripper to move toward the left, drawing the address plate with it. In this movement the address plate travels into a way in the lower face of the carrier 131. When it is in position in the carrier (as shown in the bottom view in Fig. 15, and in Figs. 21 and 22), a pair of pins 150 on the jaws 136 come into engagement with the opposite faces of a stationary cam 151, carried by a plate 152 having an ear near each end bent downwardly and secured to the carrier 155. This cam spreads the jaws to release the address plate, and the continued movement of the gripper carries it to the left out of the way, leaving the address plate in the carrier. The address plate is then gripped tightly by movement of the clamps within the carrier, and the carrier is then swung rearwardly to print. After the printing operation, the address plate is pushed from the carrier back to the receptacle on the return movement of the bar 135. A small plate 153 is secured to the end of the bar 135, and acts as a suitable abutment for the flanged end 2 of the address plate. A suitable pin 154 on the bar 135 between the jaws 136 keeps the jaws in proper alinement with the ways of the carrier.

The address plate carrier 131 is best shown in Figs. 1, 2, 5, 10, 11, 12 and 24. It comprises the following parts: a member 155, which is in the form of a downwardly facing trough having a cross portion 157, side portion 158, and arms 159 which loosely embrace the shaft 130. Slidably mounted within the hollow portion of the member 155 is a member 160, which has a shoe curved concentrically of the shaft 130 with upward arms 161 guided by grooves in the ends of the member 155. The two members 155 and 160 are held together by a tension spring 163, which is anchored at its lower end by a screw 164 to the member 160, and at its upper end by a cross rod 165 to the member 155. Between the front and rear edges of the shoe 160 and the side plates 158 of the trough-like member are movable bars 167, which have grooves 168 constituting the gripper jaws and having studs 169 extending through the top 157 of the trough and surrounded by springs 170, tending to draw the bars upwardly. Slidably keyed on the shaft 130 are a pair of cams 172, which stand over rollers 173 in the upper ends of the arms 161.

When the grippers 136 move the address plate from the stack toward the left of the machine, the cams 172 are out of engagement with the rollers 173 and the spring 163 keeps the shoe 160 in its uppermost position out of the way of the gripper with the longitudinal edges of the gripper jaws sliding in the grooves 168. After the gripper has left the address plate in the carrier the cams 172 acting downwardly on the rollers 173 force the shoe 160 downwardly, and this shoe, bearing down on the upper side of the address plate, binds it against the inwardly projecting ledges 174 on the bars 167. The shoe is provided with ribs 176 to engage the address plate between the type lines. As the cams come down on the rollers 173, the first portion of the movement brings the shoe 160 into engagement with the address plate to clamp it between the shoe and the ledges 174; the complete movement of the cams force downward the shoe and the ledges (against the action of the springs 170) into the position shown in Figs. 10 and 11, where the type of the address plates are in position to coact with the platen 133 to print. When the cams 172 clear the rollers 173 and the spring 163 returns the parts to normal position, the shoe engages inwardly projecting ribs 177 on the bars 167 to insure raising them to idle position.

It will be seen from the foregoing description that a portion of the rotation of the shaft 130 operates to effectively clamp the address plate in the carrier after a preceding portion of that rotation has operated the gripper to draw the address plate into the carrier and leave it there. After the clamping of the plate in the carrier, a still further portion of the rotation of the shaft 130 swings the carrier rearwardly to print. This is accomplished by the following mechanism: projecting forwardly from one of the arms 159 of the carrier is an arm 180, which is pivoted at 181 to the link 182, depending from an arm 183 supported on a shaft 184. Keyed on the shaft 130 is a cam 190 normally coöperating with a roller 191 at the joint of a toggle 192 and 193 mounted respectively on the shaft 184 and an arm 194 extending forward from the frame 159. The major portion of this cam is a disk which operates to hold the carrier in the position shown in Figs. 10 and 11. The cam, however, has a depression 196, and when this depression comes opposite the roller 191 the carrier is freed to swing rearwardly. At the same time, a hook 197 secured by suitable screws to the side of the cam 190 engages the hooked lower end 198 of the link 182 and draws that link downwardly, thereby drawing the arm 180 downwardly and swinging the carrier rearwardly. Through such swinging, the hook 198, by reason of its upper end being pivoted to the arm 183, withdraws itself from the hook 197, so that, as the address plate on the carrier clears the platen 133 at the end of the stroke, the hook 198 has withdrawn itself from beneath the hook 197, thus unclutching the carrier from the shaft 130, as clearly shown in Fig. 24.

Now, when the shaft and carrier are unclutched from each other, the rotation of the shaft carries the cams 172 beyond the rollers 173, and thereupon the spring 163 draws upwardly on the shoe and raises the address plate above the circle of contact with the platen. Thereupon, an outwardly extending portion of the cam notch 196 engages the roller 191 of the toggle and swings the carrier forwardly (the type being above the platen) until it is in normal position, where it is held by the cylindrical periphery of the cam 190 bearing against the roller 191. The arm 183 above referred to is made adjustable, by reason of a slot and a bolt connection 199, so that the time of separation of the hooks 197 and 198 may be regulated as desired. The link 182 is pivoted to the arm 183 by a screw which is slidable in the slot 186. This is done to increase the period of engagement of the hooks 197 and 198. A spring 195 attached to the hook 198 and to the arm 180 acts to hold the hook 198 in a position to be engaged by the hook 197.

After the shaft 130 has completed that portion of its rotation which swings the carrier rearwardly and returns it to forward position, the crown cam 148 again acts on the segment 144 to move the gripper toward the right, returning the used address plate to the receptacle, and then the remainder of the rotation of the shaft 130 operates through the cam 40 to release the receptacle, thus drawing the address plate downwardly out of the grasp of the gripper and bringing a new address plate into alinement with it. Then the operation is repeated for that address plate. The plates are cammed fully into the receptacle on the further movement of the receptacle by means of a cam 85ᵃ, Fig. 19. Accordingly, it is only necessary to supply some means for inking the type in the address plate while in the carrier to enable the mechanism described to successively print addresses on material fed between the carrier and platen 133.

The inking mechanism may conveniently be an inking ribbon 200 mounted on spools 201 and 202 carried between the ends of a bar 203 and lugs 204 on the carrier frame 155. Any suitable mechanism may be used to feed such ribbon to present a fresh face for successive impressions. I find it convenient to use the mechanism shown in Figs. 12, 13 and 23, which is mounted on the left hand side of the carrier.

The ribbon feeding mechanism referred to is as follows: The spools are rigidly connected at their left hand end with rotary studs having ratchet wheels 205 and 206. Yoking around these studs is a slidable plate 207. This plate is also guided by a screw 208 passing through the slot 209 into a stud 210 screwed into a lug of the frame 155 (Fig. 20). On the side of the plate is a pawl 211 held by a spring 212 in position to be engaged by a cam 213 on the side of one of the cams 172. The engagement of the cam 213 with the pawl 211 forces the plate toward the left (Fig. 23), and the coiled spring 215 returns the plate to normal position. Accordingly, if a pawl were mounted on the plate 207 and adapted to engage one of the ratchet wheels, it would operate to periodically feed the ribbon.

To make the feed automatically reverse from one spool to the other, when either spool becomes empty, I provide two pawls 217 and 218 which are pivoted to a plate 219, which is intermediately pivoted to the plate 207 and is normally held in position with one or the other pawl engaging its ratchet. To so hold the plate, it is provided with a pin 220 adapted to engage in either of a pair of notches 221 in the under side of the bar 222, which is guided to move vertically on the face of the plate 207 by screws 223 and is drawn downward by springs 224. As shown in Fig. 13, this bar is holding the plate 219 in position, so that the pawl 217 is acting on the ratchet 206 under the influence of the spring 228, the pawl 218 being idle.

Alongside of the plate 219 is a plate 225 having two fingers 226 loosely engaging holes in the plate 207. This plate is held in position by a screw 229 passing loosely through it into the plate 207. A spring 230 attached to the plate 219 and to the plate 225 draws the latter plate downwardly and to the left so that it engages, as in Fig. 13, the rearwardly extending arm 231 of the pawl 218, holding this pawl out of engagement with the ratchet 205. Extending downwardly from the plate 225 is a projection 232, which engages the pawl 217 when the plate 219 is in the other position and holds that pawl out of engagement with the ratchet 206, as shown in Fig. 23. Now, (referring to Fig. 13), when the spool 201 connected with the ratchet 205 becomes empty the ribbon is thereby anchored and the ratchet 206 is prevented from rotating, and this anchors the nose of the pawl 217 so that the movement of the plate 207 toward the left instead of moving the pawl, swings the plate 219 about its pivot, the pin 220 clearing its notch and passing into the other notch. In that position the pawl 217 is forced downwardly out of action with the ratchet 206, by means of the projection 232, and the pawl 218 comes downwardly into position to engage the ratchet 205, under the influence of the spring 227. The fingers 226 are made loose in their holes in the plate 207 to permit the nose of either pawl to remain in engagement with its ratchet, while shifting the rocking plate 219 until the pin 220 clears its notch, and passes into the other notch. The spring 230 then pulls the acting pawl out of engagement with its r. chet by means of the arm 231 or the projection 232, as above described.

My machine is designed to take address plates of sufficient size to carry any ordinary addresses. It is desirable to be able to print these in various positions on the paper, and to feed between the carrier and platen various sizes of paper, as for example, post cards, ordinary envelops, large size envelops, letter sheets, etc. Accordingly, to allow the carrier to be positioned as desired, I make it slidable on the shaft 130, the cams 172 and 190 which are driven by the shaft being splined to it by having keys slidable in a key-way on the shaft.

To enable all the parts of the carrier and its operating mechanism to travel as a unit, I provide a yoke 240 slidable on the shaft 184 and embracing the hubs of the arms 192 and 183, this yoke having an arm 241, which extends between one of the arms 159 and the cam 190. One of the cams 172 is held with the carrier mechanism by means of a plate 242 carried on the arm 180, which extends downwardly and is forked into the groove in the hub of the cam, thus causing it to be shifted with the carrier. The other cam 172 is held with the rest of the carrier mechanism by means of the plate 243 secured to the side of the member 161 and overhanging the side of the cam. Accordingly, the whole carrier mechanism may be shifted as a unit to put it in any position desired with reference to the paper. It is to be understood that the platen 133 is long enough to provide for any desired range of printing position. This platen is adjustable up and down by being mounted on an eccentric shaft 245 which may be swung and held by a lever 246—Figs. 1 and 4.

As a means for conveniently shifting the carrier and its operating mechanism longitudinally and for securely locking it in the desired position, I provide on the shaft 184 a loose collar 320, (Figs. 25 and 26), having an annular groove 321 in its periphery and a reduced portion 322 solidly held in a portion of the yoke 240. The collar 320 is surrounded by one end of a sleeve 324 carrying a pin 325 through one side in engagement with the groove 321. This sleeve 324 has a threaded interior and surrounds a sleeve 327 which is securely held to the shaft 184 by a pin 328 and is threaded to coöperate with the threads of the sleeve 324. Adjacent the end of the sleeve 324 and threaded on the sleeve 327 is a suitable locknut 329. The outer surfaces of the sleeve 324 and the nut 329 are suitably knurled, as shown in Figs. 1 and 2.

It will be seen that by turning the sleeve 324, it will be laterally moved along the sleeve 327 which is rigid with the shaft 184, and by means of the engagement of the pin 325 with the groove in the collar 320, the yoke 240 will be moved laterally, carrying with it the entire carrier and its operating mechanism. Very accurate registration of the address with the matter on a sheet being printed may be made by turning this sleeve 324, and the carrier may be locked in the desired position by means of the locknut 329.

To feed the paper to the address plate carrier and its platen I provide mechanism shown in Figs. 1, 2, 5, 6, 7 and 14. As shown in these figures, 250 indicates a stationarily journaled upper feed roll held between the frame standards 251 and 252. This roll is eccentrically mounted, as indicated by broken lines in Figs. 5 and 6, to permit adjustments for various thicknesses of paper and envelops. Below this feed roll is a feed roll 254 consisting of a series of sections mounted on a shaft 255. This shaft is carried in rock arms 256 extending from a rock shaft 257. Loose on this rock shaft is a collar carrying the arm 258 connected by a link 259 with the lever 260, the upper end of which carries a roller 261 bearing against a cam 262 on the shaft 130. Adjacent the collar carrying the arm 258 is a collar 330 rigid with the shaft 257 and having a forwardly projecting arm 331 carrying a screw 332. Beneath this arm 331 is an arm 334, which is carried by the collar of the arm 258 and is adapted to press upwardly on the spring 335 (Fig. 1) on the screw 332 to rock the shaft 257 and raise the rollers 254. The screw 332 and the spring 335 provide a flexible adjustable connection between the cam 262 operating the mechanism and the feed rollers 254, so that the grip on the paper may be satisfactorily regulated. Accordingly, at the proper time to feed the paper, this cam 262 swings the rollers 254 upward into engagement with the upper roller 250 to pinch the paper between them and feed it toward the printing couple. This cam 262 is adjustably mounted, there being arcual slots 263 through it, through which pass screws which secure the cam 262 to the cam 148. This allows the time of feeding to be changed with relation to movement of the plate carrier.

To prevent inadvertent feeding of the paper, I prefer to provide stop fingers 265 extending between the feed roll sections 254 and mounted on a bar 266. This bar is pivotally mounted at its ends and has connected to it a rock arm 267 which connects with an arm depending from the arm 256. The stop fingers are normally held in operative position by a spring 270 (Figs. 6 and 7) attached to the arm 267 and to the bed plate 86. A second arm 337 on the bar 266 carries a screw 338 which rests on the foot of the frame bracket 251 and limits the upward movement of the fingers 265.

When the roller sections 254 are raised to grip the paper, the raising of the forward end of the arm 268 through the adjustable connection 269 tips the bar 266 and withdraws the stop fingers 265, and thereupon the paper is fed to the printing couple described by reason of the rotation of the feed rollers. This rotation is communicated to the shaft 254 as follows: A pinion 272 on that shaft meshes with an idler 273 on the shaft 257, and this meshes with the gear 274 on the platen 133. The latter gear meshes with a pinion 275 on a shaft 276. A pinion 277 on the outer end of that shaft connects with a train of gearing which includes a gear on the shaft 130. As shown in Fig. 4, this gearing consists of a wheel 278 meshing with the pinion 277 and having rigid with it a pinion 279 meshing with the gear 280 on the shaft 130.

Suitable stripping rollers 340 may be carried by arms 341 on the rod 342 which is rigidly mounted at each end in rearwardly extending projections 343 rigid with the frame. These rollers and arms are adapted to guide the paper away from the address plate carrier. As shown, the arms 341 are made of sheet metal folded into a trough-shape, carrying the rollers between their sides at one end and having a spring 344 (Fig. 2) surrounding the shaft between the sides. These springs have a frictional engagement with the rod 342 and act to hold the rollers in position laterally, as well as down upon the platen 133, as in Fig. 10.

Any convenient means may be employed for holding the paper to be passed to the feed rollers, as will be well understood. I have shown in Figs. 2 and 3 a hand-feed table 350, which may be used, if desired. This table is shown as provided with adjustable side guides 351 and 352 to accommodate paper of different sizes or in different positions. This should be taken as illustrative of any means for presenting the sheets successively to the address plate carrier and its platen.

It will be seen from the above description that all the operations of supplying the address plate and printing from it, including the feeding of the paper supplied to the machine, and the subsequent return of the address plate, are actuated from the main shaft 130. Any suitable means may be employed to rotate this shaft.

If it is desired, however, to use the addressing machine in conjunction with a rotary printing machine, a very simple and effective method is to make the address plate carrier of the same radius as the printing drum, and to gear the shaft 130 with the printing drum so that it makes a rotation in the same time as the drum. This makes the peripheral speed of the carrier and that of the drum the same and enables the carrier to be printing on one portion of a sheet while the drum of the printing couple is printing on the other portion of the same sheet.

Any suitable gearing may be employed to effect the connection between the shaft 130 and the printing couple. I find it convenient to mount a pinion 285 on the shaft 184, this pinion being adapted to mesh with the gear 280. On the other end of this shaft I place a gear 286 which may mesh with the main gear 287 on the drum of a multigraph or rotary printing machine.

In order to properly position the addresses on the paper with relation to the other printed matter in case the machine is used with a multigraph or other printing machine, it is frequently necessary to unclutch the printing machine from the addressing machine to change the relative time of printing. To accomplish this conveniently the gear 285 (Figs. 1 and 2) is splined to be slid out of engagement with the gear 280 while changing the position of the printing matter by turning the drum of the printing machine. A spring 346 inside the extended hub 347 holds the gear 285 normally in engagement with the gear 280.

Such printing machine as above mentioned is illustrated herein in Figs. 1 to 5 inclusive, and it will be convenient at this point to briefly describe the same, it being understood that my addressing mechanism may be used with or without the printing machine, as desired. This printing machine is of the type known as the multigraph. It has upright plates 89 and 290, in which is journaled a shaft 292, on which is mounted a drumlike member 293 carrying the type. This member 293 may be a segment having rails 294 to loosely confine grooved type, and having a hook 296 to removably clamp the segment to the shaft 292, as shown and claimed in the application of H. C. Gammeter, No. 833,051, filed April 20, 1914. The segment rests on a pair of rings 297 and 298 rigid on the shaft. Between these rings are shown a pair of spools 300 and 301, which carry an inked ribbon 302 extending across the printing form.

Coöperating with the rotary type drum described is a roller platen 305 suitably geared with the gear 287 on the ring 297. Any suitable means may be employed for rotating the shaft 292 to print matter between the drum and platen. As illustrative of any such means I have shown a crank 308 secured to the shaft 292. A suitable paper feed is employed in conjunction with the rotary printing couple described, as indicated by the feed rollers 309 and 310, shown in Fig. 5. The operation of these rollers may be substantially that shown in Patent #846,992.

The type may be placed on the rotary drum by hand or by any suitable mechanism, either when the segment 293 is in place, or when it is removed. The standard multigraph on the market has a supply drum alined with the printing drum, and mechanism is provided for transferring the type as desired from the supply drum to the printing drum, as shown for example, in Patent No. 1,052,910. Such supply drum is illustrated in Figs. 1 and 2 herein at 312. The frame plate 290 has a transfer channel 313, through which type may be passed from the supply drum to the printing drum. Fig. 2 shows, at 314, the finger portion of the transfer mechanism common on the multigraph for effecting the transfer of the type.

Having thus described my invention, what I claim is:

1. In a mechanism of the class described, the combination, with a receptacle for address plates, a swinging carrier and a coöperating platen, mechanism for successively transferring address plates from the receptacle to the carrier and back to the same receptacle, and means for intermediately operating the carrier to print from the address plate.

2. In a mechanism of the class described, the combination, with a receptacle having a set of ways for individual address plates, a printing couple, mechanism for successively transferring address plates from the receptacle to the couple and back to the same ways in the receptacle, and means for intermediately operating the couple to print from the address plate.

3. In a mechanism of the class described, the combination, of a movable receptacle having an open side and arranged to hold address plates in definite positions therein and removable from various points of said side, a printing couple having rolling contact, mechanism for successively transferring address plates through the open side of the receptacle to the couple and back to the same receptacle, means for intermediately operating the couple to move the coacting portions of its surface in a direction transverse to the transferring movement to print from the address plate, and means for moving the receptacle.

4. In a mechanism of the class described, the combination, with a set of address plates, of an open sided movable receptacle having means to hold the plates spaced one above the other in a manner enabling their removal in any order, a printing couple, mechanism for transferring address plates from various parts of the receptacle to the couple and back to the same part of the receptacle, and means for intermediately operating the couple to print from the address plate.

5. The combination, with a printing couple, of a movable receptacle having means for holding address plates in different positions therein, means for transferring an address plate from the receptacle to the couple, means for then moving the couple to print, means for thereafter transferring the address plate back to the receptacle, and means for causing movement of the receptacle to present a fresh plate.

6. The combination, with a printing couple, of a movable receptacle for address plates, said receptacle being mounted to descend by gravity but normally stopped, means for transferring an address plate from the receptacle to the couple, means for moving the couple to print, means for thereafter transferring the address plate back to the receptacle, and means for releasing the receptacle and thereafter stopping it with another address plate in position.

7. The combination, with a set of address plates, of a movable receptacle having internal ways for such address plates, a printing couple, means for removing an address plate from the receptacle to the couple and there leaving it and thereafter returning it to the receptacle, means for operating the couple while the address plate is held therein independently of the transferring means, and means for automatically controlling the movement of the receptacle.

8. The combination, with a printing couple, of a set of address plates, a receptacle therefor, means for transferring an address plate from the receptacle to the couple, means for moving the couple to print, means for thereafter transferring the address plate back to the receptacle, the receptacle being mounted to descend by gravity but normally held stationary, and means for releasing it and for automatically controlling its descent.

9. The combination, with a movable receptacle for address plates, of a movable carrier, a coacting platen, means for transferring a plate from the receptacle to the carrier and back to the receptacle, means for intermediately moving the carrier to cause the address plate to print, and means for controlling the movement of the receptacle after the address plate is returned to present a fresh address plate.

10. The combination, with an intermittently movable receptacle for address plates, of an intermittently movable carrier, a coacting platen, means for transferring a plate from the receptacle to the carrier and back to the receptacle, while the receptacle and carrier are stationary, means for intermediately moving the carrier to cause the address plate to print, and means for causing movement of the receptacle after the address plate is returned to present a fresh address plate.

11. The combination, with a movable receptacle for address plates mounted to descend by gravity but normally locked against descent, of a movable carrier, a coacting platen, means for transferring a plate from the receptacle to the carrier and back to the receptacle, means for intermediately moving the carrier to cause the address plate to print, and means for releasing the receptacle after the address plate is returned to allow it to descend to present a fresh address plate.

12. The combination, with a movable receptacle for address plates, of an intermittently reciprocating carrier, means for transferring a plate from the receptacle to the carrier and back to the receptacle, a platen coacting with the carrier when the latter moves in one direction but not when it moves in the opposite direction, and means for causing movement of the receptacle after the address plate is returned to present a fresh address plate.

13. In a mechanism of the class described, the combination of a receptacle for address plates, a movable carrier, a coacting platen, means for transferring plates successively from the receptacle to the carrier and back to the receptacle, an inking ribbon mounted on the carrier and adapted to cover the address plate, and means for moving the carrier with its address plate and ribbon to print.

14. In a mechanism of the class described, the combination of a receptacle for address plates, a swinging carrier, a coacting platen, means for transferring plates successively from the receptacle to the carrier and back to the receptacle, and means for swinging the carrier with its address plate to print.

15. In a mechanism of the class described, the combination of a set of curved address plates, a receptacle therefor, a carrier mounted on an axis, a coacting platen, means for transferring plates succesively from the receptacle to the carrier and back to the receptacle, and means for swinging the carrier on its axis with its address plate to print, the curve of the address plate being concentric of said axis when the address plate is in place in the carrier.

16. In a mechanism of the class described, the combination of a receptacle for address plates, a swinging carrier, means for transferring plates successively from the receptacle to the carrier and back to the receptacle, means for swinging the carrier with its address plate to print, a platen coacting with the address plate on such movement, and means for swinging the carrier and address plate in the opposite direction with the platen out of coaction.

17. In a mechanism of the class described, the combination of a receptacle for address plates, a carrier mounted to swing about an axis, a coacting platen, means for transferring plates successively from the receptacle to the carrier and back to the receptacle, a pair of spools on the carrier, an inking ribbon thereon and adapted to extend across the address plate, and means for swinging the carrier with its ribbon and address plate to print.

18. In a mechanism of the class described, the combination, with a receptacle having ways for carrying address plates one above the other and independently removable, said receptacle having one side open, a movable carrier opposite the open side of the receptacle, a coacting platen, mechanism for transferring an address plate from the receptacle through its open side into the carrier, mechanism for then moving the carrier in one direction to print and idly in the opposite direction to initial position, and mechanism for returning the address plate into the way in the receptacle from which it was removed.

19. In a mechanism of the class described, the combination, with a receptacle having ways for carrying address plates one above the other and independently removable, said receptacle having one side open, a carrier opposite the open side of the receptacle, a coacting platen, mechanism for transferring an address plate from the receptacle through its open side into the carrier, mechanism for then moving the carrier to print, the transferring mechanism then returning the address plate into the way in the receptacle from which it was removed, and mechanism for then causing movement of the receptacle to bring a new plate to transferring position.

20. The combination of a receptacle for address plates, a movable carrier juxta-posing them, and mechanism including a reciprocating gripper having a movable jaw for engaging and drawing an address plate from the receptacle into the carrier and thereafter returning it to the receptacle.

21. The combination of a movable receptacle having means for holding address plates in definite position therein, a carrier, means for controlling movement of the receptacle to present the address plates in juxta-position with the carrier, and mechanism including a reciprocating gripper for drawing an address plate from the receptacle into the carrier, a platen, and means for moving the carrier with the plate in coaction with the platen.

22. The combination of a movable receptacle for address plates, a carrier, means for moving the receptacle to present the address plates in juxta-position with the carrier, a reciprocating gripper for drawing an address plate from the receptacle into the carrier, said gripper having a pair of jaws and a rack, and a gear engaging with said rack.

23. The combination of a set of address plates each having a flanged end, a carrier, a reciprocating gripper for drawing the address plate into the carrier, said gripper having jaws adapted to engage said flanged ends.

24. The combination of a movable receptacle, a set of address plates having flanged ends and mounted in the receptacle, a carrier, means for causing movement of the receptacle to present the address plates in juxta-position with the carrier, and a reciprocating gripper adapted to engage the flanged end for drawing the address plate from the receptacle into the carrier.

25. The combination of a receptacle for address plates, a carrier, a platen coacting therewith; mechanism operating to push an address plate part way out of the receptacle, and mechanism adapted to move such partly released plate entirely out of the receptacle and into the carrier.

26. The combination of a receptacle for address plates, a carrier, a platen coacting therewith, a plunger and mechanism operating it to push an address plate part way out of the receptacle, and a reciprocating gripper adapted to draw such partly released plate entirely out of the receptacle and into the carrier.

27. The combination of a movable receptacle for address plates, a carrier, means for causing movement of the receptacle to present the address plates in juxta-position with the carrier, mechanism operating to push an address plate part way out of the receptacle, and a gripper adapted to draw such partly released plate entirely out of the receptacle and into the carrier.

28. The combination of a receptacle having ways for address plates, a carrier having ways adapted to aline with ways in the receptacle, a plunger and mechanism operating it to push an address plate partly out from ways of the receptacle toward the carrier, and a reciprocating gripper having a pair of jaws adapted to engage such partly released plate and draw it entirely out of the receptacle and into the carrier.

29. The combination of a movable receptacle for address plates, a carrier, means for causing movement of the receptacle to present the address plates in juxtaposition with the carrier, a plunger and mechanism operating it to push an address plate part way out of the receptacle, a gripper provided with jaws adapted to engage such partly released plate, said gripper having a rack, and a gear meshing with the rack and adapted to move the gripper to draw the engaged plate entirely out of the receptacle and into the carrier.

30. In mechanism of the class described, the combination, with a receptacle having ways for carrying address plates one above the other and independently removable, said receptacle being mounted to descend by gravity but normally locked against descent, a carrier, a coacting platen, mechanism for transferring an address plate from the receptacle into the carrier, mechanism for then moving the carrier to print, there being means for then returning the address plate into the way in the receptacle from which it was removed, mechanism for then releasing the receptacle to allow it to descend to bring a new plate to transferring position, and a brake for controlling such descent.

31. In a machine of the class described, the combination of a movable receptacle for address plates, a selecting device and mechanism controlled thereby to stop the receptacle with the desired plate in active position, and means for removing such selected plate, printing from it and returning it.

32. In a machine of the class described, the combination of a movable receptacle for address plates, a plurality of settable selectors, means whereby said selectors stop the receptacle with the desired plates in active position, and means for removing such selected plate, printing from it and returning it.

33. The combination of a movable receptacle for address plates, a series of selector fingers adapted to be operated by variously located controlling features on the address plates to stop the receptacle in various positions, and means for removing an address plate from the stopped receptacle.

34. The combination of a set of address plates having variously positioned lugs, a movable receptacle for such address plates, mechanism including a series of selector fingers adapted to be operated by the various lugs to stop the receptacle in various positions, and means for removing an address plate from the stopped receptacle.

35. The combination of a movable receptacle for address plates, a series of selector fingers adapted to be operated by variously located controlling features on the address plates to stop the receptacle in various positions, means for removing an address plate from the stopped receptacle and printing from it and for thereafter returning the address plate to the receptacle, and means for automatically causing movement of the receptacle subsequent to the return of the address plate.

36. In a machine of the character described, the combination of a movable receptacle for address plates, controlling mechanism therefor, and selectors adapted to be operated by address plates to operate said mechanism, said selectors being mounted in a movable selector frame and adjustable to idle or active position therein, as desired.

37. In a machine of the character described, the combination of a movable receptacle for address plates and having a rack, a pinion meshing with said rack and connected with a ratchet wheel, a pawl coöperating with the ratchet wheel to hold the receptacle, and selectors adapted to be operated by address plates to control said pawl.

38. In a machine of the character described, the combination of a movable receptacle for address plates having a rack, a pinion meshing with said rack and connected with a ratchet wheel, a pawl coöperating with the ratchet wheel to hold the receptacle, and selectors adapted to be operated by address plates to control said pawl, said selectors being mounted in a movable selector frame and adjustable to idle or active position therein, as desired.

39. In a machine of the character described, the combination of a movable receptacle for address plates having a rack, a pinion meshing with said rack and connected with a ratchet wheel, a pawl coöperating with the ratchet wheel to hold the receptacle, mechanism for withdrawing said pawl, and selectors adapted to be operated by address plates to release the withdrawn pawl.

40. In a machine of the character described, the combination of a movable upright receptacle adapted to descend by gravity and having a rack, a pinion meshing with said rack and connected with a ratchet wheel, a pawl coöperating with the wheel to hold the receptacle, selectors adapted to be engaged and operated by descending address plates, and means actuated by the selectors for controlling said pawl.

41. The combination of a carrier having ways for supporting an address plate, a clamping device acting on the rear face of the address plate to clamp it in the carrier, a shaft on which the carrier is hung, a cam on said shaft operating the clamp, and means for swinging the carrier with its clamped address plate about the axis of the shaft.

42. The combination of a carrier having ways for supporting an address plate, a clamping device acting on the rear face of the address plate to clamp it in the carrier, a shaft on which the carrier is loosely hung, a cam on said shaft operating the clamp, means for locking the carrier with its clamped address plate to the shaft, whereby the rotation of the shaft swings the carrier, and means for releasing the carrier from the shaft.

43. In a mechanism of the character described, the combination of a shaft adapted to be continuously rotated, an address plate carrier loosely mounted on said shaft, means for locking the carrier to the shaft for a portion of the rotation thereof, and means for then unlocking the carrier and swinging it in the reverse direction without stopping the rotation of the shaft.

44. The combination of a shaft, a carrier loosely mounted on the shaft, means for locking the carrier to the shaft for a portion of the rotation of the shaft and then releasing it, a cam on the shaft, and mechanism operated thereby for swinging the carrier in reverse direction when it is released.

45. The combination of a shaft, a carrier loosely mounted on the shaft, means for locking the carrier to the shaft for a portion of the rotation thereof and then releasing it, a cam on the shaft having a portion of its periphery circular, a roller connected with the carrier and bearing against such periphery, whereby the carrier is held against movement, said cam having a notch which allows the swinging of the carrier and then acts positively on the roller to return the carrier.

46. The combination of a shaft, a carrier loosely mounted on the shaft, a hook rigidly connected with the shaft, an arm rigid with the carrier, and a hook carried by said arm and adapted to be engaged by the hook on the shaft, the hook on the arm being anchored at a point beyond the arm, whereby the movement of the arm gradually swings its hook out of engagement with the hook on the shaft.

47. The combination of a shaft adapted to be continuously rotated, an oscillatable carrier hung on the shaft, a platen coöperating with the carrier, movable means on the carrier for holding an address plate in coaction with the platen or withdrawing it therefrom, means for locking the carrier to the shaft when an address plate is in active position, and means for releasing the carrier from the shaft, withdrawing the address plate from positive position and returning the carrier.

48. The combination of a shaft adapted to be continuously rotated, a carrier loosely mounted thereon and adapted to carry an address plate, a platen with which such address plate may co-act, a clamping device on the carrier for the address plate, a cam on the shaft for operating the clamping device, mechanism for locking the carrier to the shaft when the address plate is clamped and unlocking the same following the printing stroke, whereby said cam releases the clamped address plate, means for withdrawing the plate form active position when so released, and a second cam on the shaft, and mechanism operated thereby to return the carrier to normal position when the address plate is withdrawn.

49. The combination of a shaft adapted to be continuously rotated, a carrier loosely mounted on the shaft, mechanism for locking the carrier to the shaft for a portion of the rotation of the shaft and then releasing it, and mechanism operated thereby for swinging the carrier in reverse direction when it is released, and means for longitudinally shifting said carrier and mechanism as a unit.

50. In a mechanism of the character described, the combination of a shaft, an address plate carrier loosely mounted on said shaft, means for locking the carrier to the shaft for a portion of the rotation thereof, means for then unlocking the carrier and swinging it in the reverse direction, and means for shifting the carrier along the shaft.

51. The combination, with an oscillating carrier adapted to hold an address plate, mechanism for moving the address plate into and out of the carrier, means for locking the address plate therein, means for swinging the carrier with its locked address plate about an axis, a platen on a parallel axis coöperating with the address plate, and a pair of ribbon spools mounted on the carrier and adapted to hold a ribbon extending across the address plate.

52. The combination, with an oscillating carrier adapted to hold an address plate, mechanism for moving the address plate into and out of the carrier, means for swinging the carrier with its address plate about an axis, a platen on a parallel axis coöperating with the address plate, a pair of ribbon spools mounted on the carrier and adapted to hold a ribbon extending across the address plate, and ribbon feeding mechanism mounted on the carrier and adapted to automatically progress the ribbon consequent upon the swinging of the carrier.

53. The combination, with an oscillating carrier adapted to hold an address plate, means for swinging the carrier with its address plate about an axis, a platen on a parallel axis coöperating with the address plate, a movable receptacle for address plates, mechanism for transferring them successively to and from the carrier, and mechanism for moving the receptacle between the transference of successive plates.

54. The combination, with a body printing couple having rolling contact, of an address printing couple having rolling contact, gearing connecting the two to give the address couple the same contacting speed as the other couple, a series of individual address plates, a receptacle therefor, and means for automatically feeding an address plate from the receptacle to the address couple and from the address couple back to the receptacle and repeating such feeding operation for different plates.

55. The combination, with a rotary printing couple, of an oscillating printing couple adapted to carry a removable address plate, gearing connecting the two to give the address couple the same peripheral speed as the other couple, and means for automatically feeding an address plate to and from the address couple.

56. The combination, with a rotary printing couple, of an address printing couple having rolling contact, gearing connecting the two to give the address couple the same contacting speed as the other couple, means for automatically feeding an address plate to and from the address couple, and independent inking ribbons carried by the respective couples.

57. The combination of a rotary type-carrying drum and platen, an address plate carrier mounted on an axis parallel with the axis of the drum and holding the type of its plate the same radial distance from its axis as the type on the drum is from its axis, a platen coacting with the address plate carrier, means for simultaneously turning the drum and carrier at the same rotative speed, whereby the printing by both couples is accomplished at the same peripheral speed, and means for automatically and successively placing address plates in the carrier and removing them therefrom.

58. The combination of a rotary printing drum, a shaft parallel with the axis thereof, gearing between the drum and shaft adapted to turn the shaft at the same angular speed as the drum, an address plate carrier loosely on said shaft and having the same radial dimension as the drum, a platen coacting with the address plate carrier, and means for locking the address plate carrier to the shaft.

59. The combination of a rotary printing drum, a shaft parallel with the axis thereof, gearing between the drum and shaft adapted to turn the shaft at the same angular speed as the drum, an address plate carrier loosely swung on said shaft and having the same radial dimension as the drum, having a platen coacting with the address plate carrier, means for locking the address plate carrier to the shaft and releasing it therefrom and returning it without stopping the shaft, and mechanism for placing an address plate in the carrier and removing it therefrom.

60. The combination, with a rotary printing drum, of an oscillating address plate carrier mounted on an axis parallel with the axis of the drum, mechanism for placing an address plate in the carrier, a platen coacting with the address plate carrier, and means for swinging the address plate carrier simultaneously with a portion of the rotation of the drum and at the same peripheral speed.

61. The combination, with a rotary printing drum, of an oscillating address plate carrier mounted on an axis parallel with the axis of the drum and having the same radial dimension as the radial dimension of the drum, mechanism for transferring address plates to and from the carrier, a platen coacting with the address plate carrier, and means for swinging the address plate carrier simultaneously with the portion of the rotation of the drum and at the same rotative and peripheral speed.

62. The combination, with a rotary printing drum, of an oscillating address plate carrier mounted on an axis parallel with the axis of the drum, means for feeding address plates to the carrier, a platen coacting with the address plate carrier, means for swinging the address plate carrier simultaneously with a portion of the rotation of the drum and at the same peripheral speed and in the same direction with the drum's rotation, and means for swinging the carrier in the opposite direction during another portion of the drum's continuous rotation.

63. The combination, with a rotary printing drum, of an oscillating address plate carrier mounted on an axis parallel with the axis of the drum and having the same radial dimension as the radial dimension of the drum, means for automatically placing an address plate on the carrier, a platen coacting with the address plate carrier, means for swinging the address plate carrier simultaneously with a portion of the drum's rotation, means for swinging the carrier in the opposite direction during another portion of the drum's rotation, and means on the drum and the carrier for carrying independent inking ribbons.

64. The combination, with an address plate carrier, of an address plate receptacle comprising front and back parallel plates grooved on their interior faces and suitably spaced apart, address plates occupying said grooves consisting of slotted members with grooved type set up in their slots, and transfer mechanism including a gripper adapted to engage the plate and draw it into the carrier.

65. The combination, with an address plate carrier, of an address plate receptacle comprising front and back parallel plates grooved on their interior faces and suitably spaced apart, address plates occupying said grooves consisting of slotted members with grooved type set up in their slots, said receptacle being open on the side adjacent to the carrier and also on the opposite side, a plunger adapted to abut the plate on the opposite side of the carrier and shove it toward the carrier, and a gripper adapted to engage such shoved plate and draw it into the carrier.

66. The combination of a rotary body-printing couple, an adjacent address-printing couple, one member of which is reciprocatory, one of said couples being positioned in front of the other, a receptacle adapted to carry a set of mutually independent address plates, means for transferring address plates successively to and from the latter couple, and means for feeding paper from one couple to the other to receive two imprints on the same side.

67. The combination of a body-printing couple, an adjacent address-printing couple, means for transferring address plates successively to and from the latter couple, a receptacle in which the address plates are stacked and from and to which they are transferred, means for concurrently moving both members of the address-printing couple to print an address by rolling contact, and means for feeding paper from one couple to the other to receive two imprints on the same side.

68. The combination of a body-printing couple, an adjacent address-printing couple one in front of the other, means for transferring address plates successively to and from the latter couple, a receptacle for the address plates, means for causing its movement after each transference of a plate therefrom, and means for feeding paper from one couple to the other to receive two imprints on the same side.

69. The combination, with a rotary printing couple, of an adjacent address plate carrier, a platen adapted to coact therewith, said carrier and its platen being positioned with relation to the rotary couple so that one may print the address and the other the body on the same sheet of paper, means for transferring an address plate to said carrier, leaving it there during the printing action of the carrier, and thereafter removing it from said carrier, and independent paper feed devices for the addressing mechanism and the rotary couple.

70. The combination of a rotary printing couple, an oscillatory address plate carrier, mechanism for putting a plate on the carrier and removing it therefrom, a platen coöperating with said carrier, said platen and carrier and printing couple being positioned one in front of the other, and mechanism for moving the platen and oscillatory address plate carrier concurrently to print by rolling coaction.

71. The combination, with a rotary printing couple, of an underhung oscillatory segment, means for placing an address plate on the under face of said segment and thereafter removing it therefrom, a platen below the segment, and means for swinging the segment in coaction with its platen, the platen and segment being located adjacent to the rotary printing couple and close enough thereto to act on a sheet, a portion of which is between the members of the printing couple.

72. In an address-printing device, the combination of a movable receptacle for address plates adapted to descend by gravity, means for controlling the descent to bring successive plates to active position, an address plate carrier adapted to move in a path which is offset from and transverse to the path of movement of the receptacle, and means for transferring a plate directly from the receptacle to the carrier.

73. The combination of an oscillatory underhung segment having means on its lower face for carrying an address plate, a movable receptacle for address plates, the path of movement of the segment at one point alining with the path of movement of the receptacle, and means for transferring plates between the receptacle and segment at such alined portions of their paths.

74. The combination of a carrier having supporting ways along its under face, means for shoving an address plate into said ways, a clamp above the address plate, means for operating the clamp to lock the address plate in the carrier, means for moving the carrier, and a platen with which the plate in the carrier may coact.

75. The combination with an address-printing couple, of a series of plates adapted to be individually placed on the couple, the various plates having selective features, a receptacle for said plates, a selecting device, mechanism controlled by the selecting device for causing the removal from the receptacle of certain plates according to the features thereon while leaving the remaining plates in the receptacle, and means for automatically placing a selected plate on the address printing couple.

76. The combination of an address printing couple, a movable receptacle for address plates, a series of address plates having defining characteristics and adapted to be stored in the receptacle, a selecting device coacting with the defining characteristics of the plate as the receptacle moves, whereby a desired plate may be selected from the mass, and means for automatically placing such selected plate on the address couple.

77. The combination, with an address printing couple, of a series of address plates having differently located characteristic features, a receptacle for said address plates, a series of selector fingers adapted to be operated by the variously located characteristic features on the address plates to cause the selection of the corresponding plate, and means for removing from the receptacle the address plate so selected and transfer it to the printing couple.

78. The combination, with a carrier having ways for supporting an address plate, a shaft on which the carrier is loosely hung, means for locking the carrier to the shaft, means for releasing the carrier from the shaft, means for turning the shaft, and a platen with which the address plate may coact when the carrier is locked to the shaft and the shaft turned.

79. The combination of a rotary printing drum, an oscillatory carrier associated therewith, means for automatically placing an address plate on the oscillatory carrier, means for concurrently moving the rotary drum and the oscillatory carrier, and platens coacting respectively with the drum and carrier.

80. The combination of a rotary printing drum, a movable carrier, automatic means for placing an address plate on the carrier and thereafter removing it therefrom, mechanism for moving the drum and the carrier in the printing direction at the same contacting speed, individual platens coacting respectively with the drum and carrier during such movement, and means for returning the carrier out of coaction with its platen.

81. The combination of a rotary printing drum, a movable carrier associated therewith, means for automatically placing an address plate on the carrier, means for concurrently moving the rotary drum and the carrier, platens coacting respectively with the drum and carrier, and independent inking ribbons mounted on the drum and the address carrier.

82. The combination, with a rotary printing couple, of a reciprocatory printing couple adapted to carry a removable address plate, gearing connecting the two to give the address couple the same peripheral speed as the other couple, and means for automatically feeding an address plate to and from the address couple.

83. The combination of a rotary printing drum, a reciprocatory carrier associated therewith, means for automatically placing an address plate on the reciprocatory carrier, means for concurrently moving the rotary drum and the reciprocatory carrier, and platens coacting respectively with the drum and carrier.

84. In a mechanism of the class described, the combination, with a receptacle for address plates, a printing couple, mechanism independent of the couple for successively transferring address plates from the receptacle to one member of the couple and back to the same receptacle, and means for intermediately operating the couple to print from the address plate.

85. In a mechanism of the class described, the combination of a receptacle for address plates, a movable carrier, a coacting plate, mechanism for transferring plates successively from the receptacle to the carrier and back to the receptacle, and means for moving the carrier with its address plate to print.

86. In a mechanism of the class described, the combination of a receptacle for address plates, a reciprocatory carrier, means for transferring plates successively from the receptacle to the carrier and back to the receptacle, means for moving the carrier with its address plate in one direction to print, a platen coacting with the address plate on such movement, and means for moving the carrier and address plate in the opposite direction with the platen out of coaction.

87. In a mechanism of the class described, the combination of a receptacle for address plates, a movable carrier, a coacting platen, means for transferring plates successively from the receptacle to the carrier and back to the receptacle, a pair of spools on the carrier, an inking ribbon thereon and adapted to extend across the address plate, and means for moving the carrier with its ribbon and address plate to print.

88. The combination, with a movable carrier adapted to hold an address plate, mechanism for moving the address plate into and out of the carrier, means for locking the address plate therein, means for moving the carrier in one direction with its locked address plate, a platen coöperating with the address plate on such movement, means for moving the carrier in the opposite direction with the address plate out of coaction with the platen, and a pair of ribbon spools mounted on the carrier and adapted to hold a ribbon extending across the address plate.

89. The combination, with a reciprocatory carrier adapted to hold an address plate, means for moving the carrier with its address plate, a platen adapted to coöperate with the address plate while the plate is moving, a movable receptacle for address plates, mechanism for transferring them successively to and from the carrier, and mechanism for moving the receptacle between the transference of successive plates.

90. The combination, with a body printing couple having rolling contact, of an address printing couple having rolling contact, gearing connecting the two to give the address couple the same contacting speed as the other couple, a series of individual address plates, a receptacle therefor, and means for automatically feeding address plates from the receptacle to the address couple and thereafter from the address couple.

91. The combination, with a rotary printing drum, of a reciprocatory address plate carrier adapted to move the plate in a path parallel with the axis of the drum, a coacting platen, mechanism for placing an address plate in the carrier, and means for moving the carrier as described simultaneously with a portion of the rotation of the drum and at the same contacting speed.

92. The combination, with a rotary printing drum, a platen therefor, of a reciprocatory address plate carrier, a platen for it, means for automatically placing an address plate on the carrier, means for moving the address plate carrier simultaneously with a portion of the drum's rotation, and at the same contacting speed, means for moving the carrier in the opposite direction during another portion of the drum's rotation, and means on the drum and the carrier for carrying independent inking ribbons.

93. The combination of a body-printing couple, an adjacent address-printing couple, means for transferring address plates successively to and from the latter couple, a receptacle adapted to hold the address plates, means for concurrently moving both members of the address-printing couple to print an address by rolling contact, and means for feeding paper from one couple to the other to receive two imprints on the same side.

94. The combination of a rotary printing couple, a movable address plate carrier, mechanism for putting a plate on the carrier and removing it therefrom, a platen coöperating with said carrier, said platen and carrier and printing couple being positioned one in front of the other, and mechanism for moving the platen and address plate carrier concurrently to print by rolling coaction.

95. The combination of a reciprocatory carrier having means for carrying an address plate, a movable receptacle for address plates, the path of movement of the carrier at one point alining with the path of movement of the receptacle, and means for transferring plates between the receptacle and carrier at such alined portions of their paths.

In testimony whereof, I hereunto affix my signature in the presence of two witnesses.

GEORGE T. TRUNDLE.

Witnesses:
ALBERT H. BATES,
JUSTIN W. MACKLIN.